Sept. 24, 1968  S. A. H. WEXEL  3,402,425
METHOD OF WHOLLY OR PARTIALLY CUTTING OUT THE
BACKBONE OF OPEN CARCASSES, SUCH AS
PIGS' CARCASSES, AND APPARATUS FOR
CARRYING OUT THIS METHOD Filed Oct. 7, 1965  2 Sheets-Sheet 1

INVENTOR
Svend A. H. Wexel

BY Stevens, Davis, Miller & Mosher
ATTORNEYS

Sept. 24, 1968  S. A. H. WEXEL  3,402,425
METHOD OF WHOLLY OR PARTIALLY CUTTING OUT THE
BACKBONE OF OPEN CARCASSES, SUCH AS
PIGS' CARCASSES, AND APPARATUS FOR
CARRYING OUT THIS METHOD
Filed Oct. 7, 1965  2 Sheets-Sheet 2
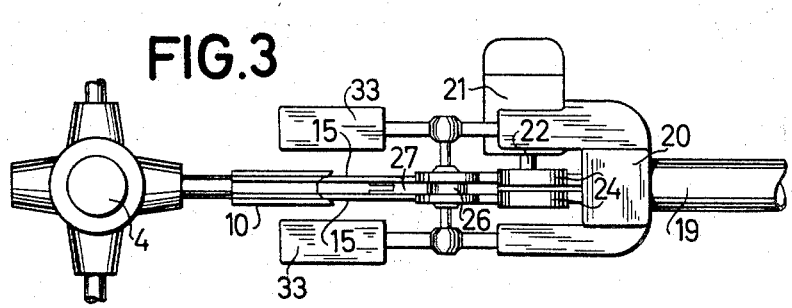
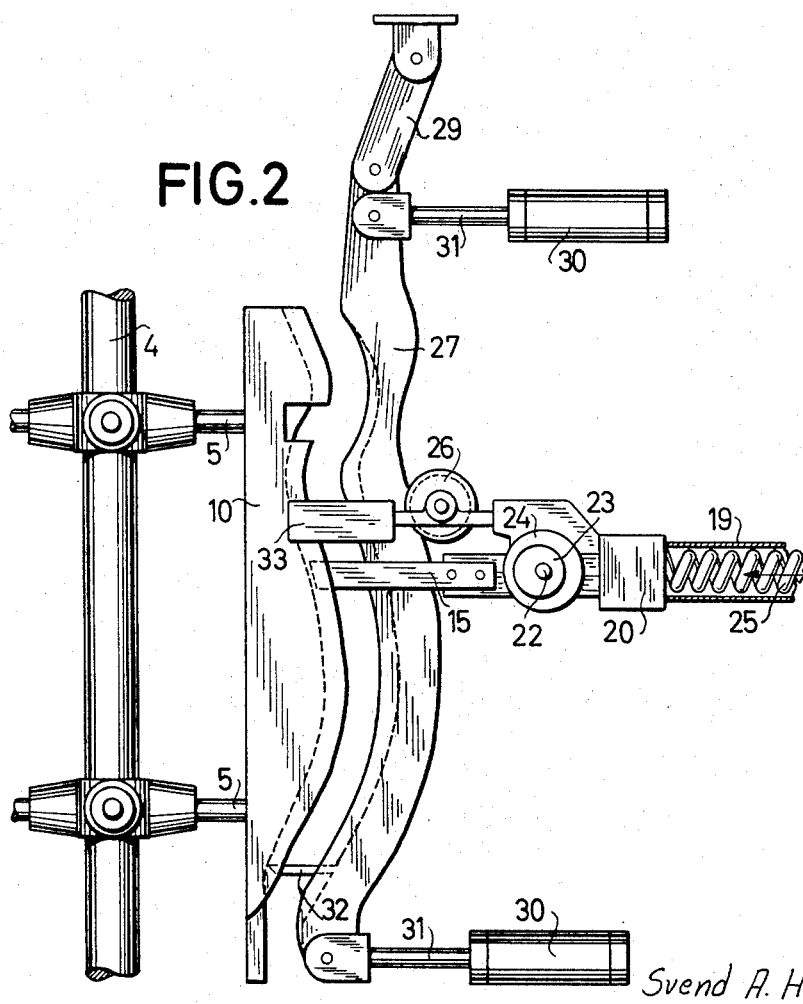
INVENTOR
Svend A. H. Wexel
BY Stevens, Davis, Miller & Mosher
ATTORNEYS United States Patent Office 3,402,425
Patented Sept. 24, 1968

3,402,425
METHOD OF WHOLLY OR PARTIALLY CUTTING OUT THE BACKBONE OF OPEN CARCASSES, SUCH AS PIGS' CARCASSES, AND APPARATUS FOR CARRYING OUT THIS METHOD
Svend A. H. Wexel, Skive, Denmark, assignor to Slagteriernes Forskningsinstitut, Roskilde, Denmark, a company of Denmark
Filed Oct. 7, 1965, Ser. No. 493,672
Claims priority, application Denmark, Oct. 15, 1964, 5,120/64
5 Claims. (Cl. 17—23)

ABSTRACT OF THE DISCLOSURE

An apparatus for partially removing the backbone of an animal carcass, including means for suspending the carcass by at least one leg, an abutment rail for supporting the vertical side of the backbone, a clamping rail for gripping the backbone and pressing same against the abutment rail, and a knife device for cutting to each side of the backbone.

---

Figure 1:
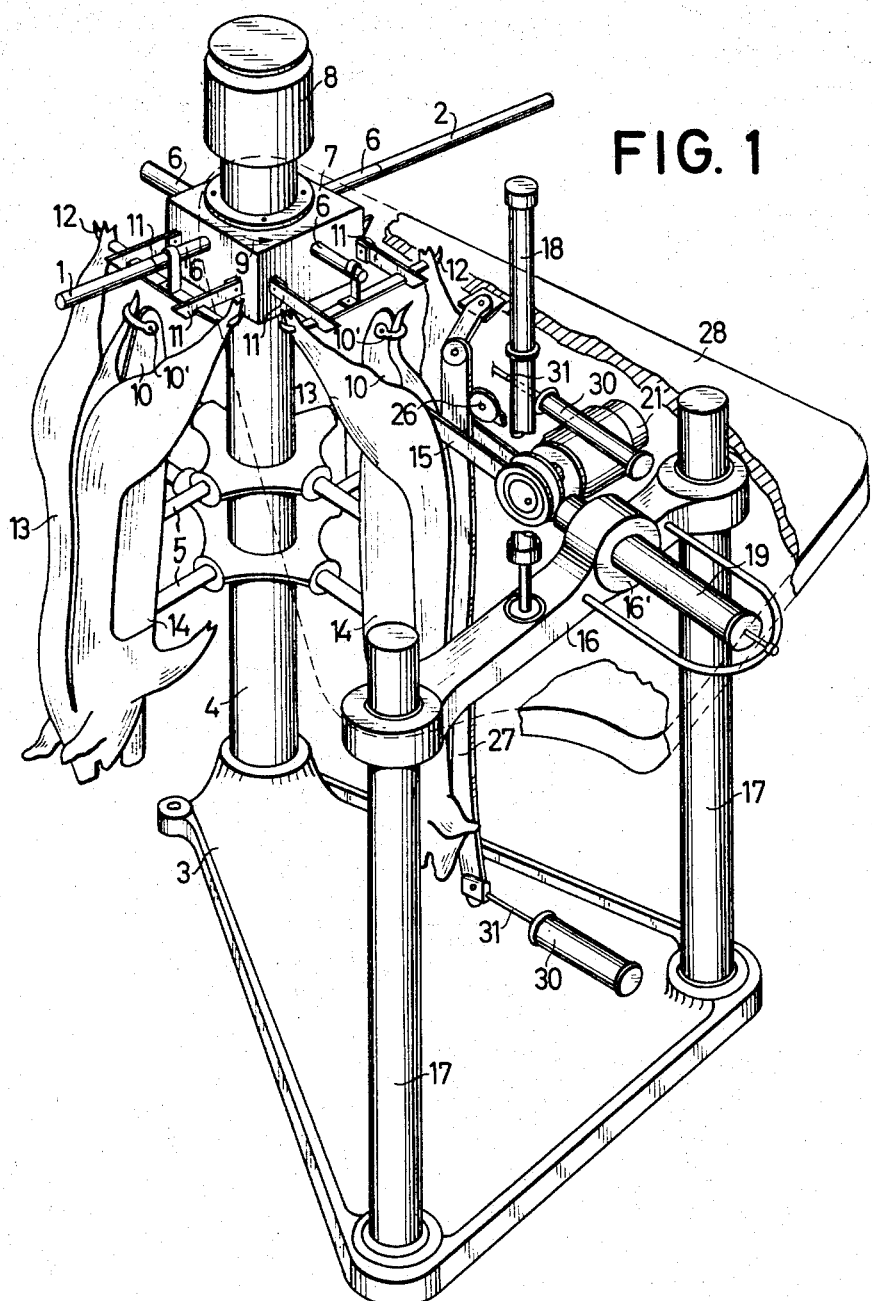

After cutting open a carcass at the ventral side thereof and removing the entrails, it is often desirable to halve or divide the carcass along a section following the backbone. To this end the backbone proper may be split, for example by being sawed through, but it is often preferable instead to completely remove the backbone from the carcass. Usually, this work is carried out manually, namely by chopping out the backbone by means of a hand-axe, and if carried out with care and skill this operation leaves only fairly negligible quantities of meat on the backbone.

This invention has for its object to provide the possibility of mechanising this cutting-out operation of the backbone in such a way as to make possible the achievement of results just as good as those obtained through the manual method.

More specifically, this invention relates to a method of wholly or partially cutting out the backbone of carcasses, such as pigs' carcasses, by means of a knife arrangement comprising two knives working along one side each of the backbone, said knives being caused to move in a chopping and cutting fashion and simultaneously passed downwardly along the backbone whilst the carcass is suspended from a sliding gambrel or similar carrier movable along a conveying rail.

The chopping and cutting motion imparted to the knives will cause them to work in principally the same way as a hand-axe, but to obtain a perfect cutting-out of the backbone by means of such knives, an exact guiding of the knives with respect to the backbone is required. To this end, the knives could for example be so controlled directly by the backbone as to be forced to follow the sideways movements to which a freely suspended carcass will invariably be subjected during the treatment. However, this possibility is hardly practically feasible, amongst other things because the backbone in itself is unsuitable as a guiding face for the knife movement. Another possibility which has been tried in practice consists in keeping the suspended carcass at rest by means of holders gripping internally and externally of the sides of the carcass, and in guiding the knife movement by means of a template that is stationary with respect to the carcass retained, and the length of which corresponds as nearly as possible to the longitudinal profile of the carcass. A condition for obtaining perfect results through this measure is, however, that the backbones of the different carcasses have the same shape since, otherwise, the template guiding of the knives will not be correct. However, it is not to be expected that this condition is fulfilled in practice in that the backbones of the different carcasses will vary in different ways from the "ideal shape" or "average shape" represented by the template, and even minor variations in this respect will mean that the knives will not come to work in the manner intended.

Through the method according to the invention this uncertainty factor is eliminated as in this instance the backbone is during the cutting-out operation firmly clamped between an internal rail and an external rail of U-shaped cross section, which with its flanges grip the spinal processes of the backbone.

This procedure affords not only an extremely effective direct clamping of the backbone but it also ensures that backbones of varying shapes by the clamping between said two rails are caused to assume quite a specific shape that conforms exactly with the shape of a template serving for guiding the knife movement.

If, moreover, according to the invention the two rails are used as guides for the knives during their downwards movement with respect to the backbone, the external rail serving with its side faces as abutments for the insides of the knives whilst the outsides thereof at the free knife ends are kept in engagement with guiding faces in the internal rail, it will be possible to attain an extremely reliable guiding of the knives so that the cut-out backbone will display the "banana holes" so desirable in practice, which are indicating that parts of the dorsal vertebrae have been cut off with great accuracy together with the ribs.

This high degree of accuracy in cutting out the backbone depends for one thing on the above-mentioned safe clamping of the backbone in an exactly predetermined shape, and for another thing on the fact that the knives are precisely guided in the lateral directions because the two rails prevent them from making uncontrolled sideways movements both away from and towards one another.

The invention also relates to an apparatus for carrying out the said method. This apparatus is characterised in that between a first conveying rail section and a second conveying rail section a revolving stand is interposed which comprises two or more supporting rails conforming in shape to the longitudinal profile of the backbone of the carcass and so arranged that by revolving of the stand they may be caused to adopt successively a first position opposite said first conveying rail section, a second position opposite an upwardly and downwardly movable knife arrangement associated with a clamping rail for the backbone of the carcass, said rail being movable towards and away from the stand, and finally a third position opposite the second conveying rail section.

Such apparatus permits of being naturally fit into the working cycle in an abattoir and may to an essential degree contribute to the full automation of said working cycle. Thus, from the first conveying rail section the carcasses may be passed into the revolving stand successively and enter into engagement with one of the supporting rails thereof, and when the stand is revolved, the carcass so introduced may then be caused to adopt a position opposite the clamping rail which, for example hydraulically or mechanically, may be moved towards the carcass and then be pressed in over the spinal processes of the backbone, said spinal processes having in advance been cut free. At the termination of this clamping movement the backbone will be in firm engagement with the supporting rail of the revolving stand and will, with great accuracy, assume the shape determined by the two rails. Now, the knife arrangement may be put in operation in such manner as to be guided accurately and positively in conformity with the shape of the backbone. On completion of the cutting-out operation, the movable clamping rail may be withdrawn to permit the stand of being advanced one step. In this new position, the carcass treated may from the stand be passed on the second conveying rail section.

In some cases it is desirable to sever the backbone completely from the carcass proper. To this end, the clamping rail of the apparatus according to the invention may at the vicinity of its lower end be provided with a chisel which is adapted to sever the backbone of the carcass at the head end thereof when said rail is moved towards the supporting rail. Consequently, this severance is automatically carried out by the clamping rail movement towards the supporting rail.

Moreover, the back of the clamping rail may be designed as a guide curve for the knife arrangement to determine the depth of penetration of the knives into the carcass. This opens the possibility of simplifying the design of the apparatus because a separate external guide template for the knife arrangement will become superfluous.

The invention will be particularly explained below with reference to the accompanying drawings, which show an embodiment of the apparatus according to the invention.

FIG. 1 is a perspective view of the apparatus with certain parts broken away.

FIG. 2 a side elevation illustrating a supporting rail of the apparatus and the movable clamping rail with the knife arrangement, and FIG. 3 a top plan view of the parts shown in FIG. 2, with parts being omitted.

In FIG. 1, 1 and 2 designate two sections of a conveying rail or slide bar extending through an abattoir, from which rail or bar the carcasses are suspended in conventional sliding gambrels or the like carriers. Between the two rail sections 1 and 2 there is interposed a revolving stand consisting of a column 4 journalled in a base plate 3, said column 4 carrying a plurality of double arms 5; in the embodiment shown there are four such double arms. Above said double arms the stand is provided with four protruding rod ends 6 which may pairwise be brought into alignment with the two rail sections 1 and 2. The rod ends 6 protrude from a housing 7 carrying an electric motor 8 and enclosing a coupling through which the electric motor 8 can impart to the revolving stand an intermitting rotary movement in the direction of the arrow 9. Further, the housing 7 carries four sets of gambrel locks 11 for preliminarily retaining the gambrels 12 in which the carcasses, in this case pigs' carcasses 13, are suspended.

After having been cut open at their ventral sides and back sides, and after removal of the entrails, the carcasses arrive along the conveying rail section 1 and are moved so close to the column 4 of the stand that the gambrel 12 is moved on to one rod end 6 of the revolving stand. In this position the carcass 13 is engaged and gripped by holders 14 associated with the double arms 5, each of which further carries a substantially vertical supporting rail 10 which constitutes an abutment for the inside or underside of the backbone of the carcass suspended from the stand, and to which rail 10 the tail of the carcass may be loosely retained, for example by means of a stirrup 10' as indicated in FIG. 1.

When the stand is turned 90° in the direction of arrow 9, the carcass so retained will be brought into a position opposite a knife arrangement for wholly or partially cutting-out the backbone. This knife arrangement comprises two substantially parallel knives 15 disposed on a knife holder or bridge 16 which is vertically displaceable along two columns 17 secured in the base plate 3. In the embodiment shown in FIG. 1 the bridge 16 is moved up and down by means of a hydraulic or pneumatic actuating cylinder 18 which by suitable means, not shown, is connected to a frame top plate 28 indicated in FIG. 1.

A horizontally displaceable guide tube 19 is accommodated in a bearing 16' in the bridge 16, as shown in FIGS. 2 and 3, and via a collar 20 at its front end, this guide tube supports an electric motor 21, not shown in FIG. 2, whose shaft 22 via a pair of eccentrics 23 and eccentric rings 24 permits an adjustment of the eccentricity drives the two knifeblades 15. These knife-blades 15 are so disposed in the guide tube 19 that during operation of the electric motor 21 they make both reciprocal and upwards and downwards movements. In the embodiment shown it is assumed that the two knives are operated by a common eccentric arrangement, but if it be so wished, for example with a view to permitting individual setting and operation of the two knives, the latter may also be entirely independent of one another.

The depth of penetration of the knives 15 into the carcass 13 depends on the position of the guide tube 19 in the bridge 16. This position is determined by a compression spring 25 continuously urging the guide tube 19 ahead so that a roller 26 supported by the guide tube 19 via the collar 20 is maintained in engagement with a clamping rail 27 located opposite the supporting rail 10 and serving as a guide curve for the roller 26. Said clamping rail 27 is suspended from the top plate 28, shown in dotted line in FIG. 1, through a linkage 29, FIG. 2, enabling it to move towards and away from the supporting rail 10 of the revolving stand 4, 5. In the embodiment shown in the drawings the clamping rail 27 is reciprocated by means of a pair of hydraulic or pneumatic cylinders 30, whose piston rods 31 are connected with the rail 27 at the upper and lower ends thereof. Below, the clamping rail 27 is provided with a cross knife or chisel 32, which when the rails approach the supporting rail 10 severs the backbone clamped against the rail 10.

As will most clearly appear from FIG. 3, the supporting rail 10 as well as the clamping rail 27 are of U-shaped cross sections. As concerns the clamping rail 27 this is owing to the fact that during its clamping movement this rail is to slide in over the spinal processes of the backbone for the purpose of fixing the latter in the lateral directions. The supporting rail 10 on the other hand must only constitute a firm abutment for the inside or underside of the backbone, but it is preferable that this rail 10 also constitutes the external side guides for the two knives 15, such as will appear from FIGS. 2 and 3. Consequently, the knives cannot move away from one another in the lateral directions, and at the same time the clamping rail 27 ensures that the knives cannot be squeezed together, the side faces of said rail constituting the internal side guides for the knives.

The incision made by the knives 15 may be kept open by horizontal rotary rollers 33, as shown in FIGS. 2 and 3, which are mounted closely above the knives. The rotation of these rollers 33 also serves to eject the backbone when it has been cut completely free from the remaining carcass.

This done, the clamping rail 27 may be withdrawn whereby also the guide tube 19 together with the parts disposed thereon is withdrawn from the revolving stand 4, 5 due to the fact that its roller 26 engages the rail 27. The stand 4, 5 may now be turned through another angle of 90° in the direction of the arrow 9 so that the carcass treated is brought opposite the conveying rail section 2 and may be passed on for further treatment.

It will be appreciated that the apparatus described may by means of control arrangements known per se be made capable of working fully automatical, i.e. without any manual operation.

I claim:
1. An apparatus for at least partially cutting out the backbone of an opened carcass, such as a pig's carcass, suspended in its hind legs, comprising a stand interposed between a first and a second suspension rail, section, means for intermittently revolving said stand on a substantially vertical axis, at least two abutment rails conforming in shape to the longitudinal profile of the back- bone of the carcass and mounted on said stand in such positions that by the intermittent revolving motion of the stand said abutment rails are successively kept stationary in a first location opposite said first suspension rail section, a second location, and a third location opposite said second suspension rail section, a clamping rail parallel to said abutment rails in said second location thereof, means to move said clamping rail towards said stand when stationary to firmly clamp the backbone against the abutment rail in said second location, and a knife device associated with and guided for motion along said clamping rail.

2. An apparatus as claimed in claim 1, wherein said clamping rail is of channel formation and so arranged as to be able to grip the spinal processes of the backbone.

3. An apparatus as claimed in claim 1 wherein a backbone severing chisel is provided adjacent the lower end of said clamping rail.

4. An apparatus as claimed in claim 1, wherein said clamping rail forms a guide surface cooperating with said knife device for determining the depth of the knife penetration into the carcass.

5. An apparatus for at least partially removing the backbone of an animal carcass, comprising means for individually suspending the carcass by at least one leg, an abutment rail for firmly supporting the ventral side of the backbone of the carcass, a clamping rail of channel formation capable of gripping the spinal processes of the backbone and pressing the backbone against said abutment rail, and a knife device movable with respect to said clamping rail and having two knives for working on each side of the backbone during said movement.

References Cited

UNITED STATES PATENTS

| 1,015,590 | 1/1912 | Saunders | 17—23 |
| 1,356,169 | 10/1920 | Peters | 17—23 |
| 2,634,457 | 4/1953 | Moyer et al. | 17—23 |
| 3,095,602 | 7/1963 | Kottner | 17—23 |

FOREIGN PATENTS

| 39,714 | 1/1929 | Denmark. |
| 42,490 | 6/1930 | Denmark. |

LUCIE H. LAUDENSLAGER, *Primary Examiner.*